United States Patent [19]

Andersson et al.

[11] Patent Number: 5,580,212
[45] Date of Patent: Dec. 3, 1996

[54] SIDE SHIFTING CARRIAGE FRAME STICK PLACER

[75] Inventors: Bert L. Andersson; Douglas A. Foster, both of Salmon Arm, Canada

[73] Assignee: Newnes Machine Ltd., Salmon Arm, Canada

[21] Appl. No.: 409,515

[22] Filed: Mar. 23, 1995

[30] Foreign Application Priority Data

Dec. 8, 1994 [CA] Canada ................................. 2137701

[51] Int. Cl.⁶ .......................................... B65G 57/26
[52] U.S. Cl. .................. 414/789.5; 414/793.5; 414/786
[58] Field of Search .................. 414/789.5, 793.5, 414/794.3, 794.2, 786; 198/680

[56] References Cited

U.S. PATENT DOCUMENTS

| | | | |
|---|---|---|---|
| 3,823,834 | 7/1974 | Rysti | 214/6 |
| 3,904,044 | 9/1975 | Lundin | 414/789.5 |
| 4,144,976 | 3/1979 | Rysti | 414/42 |
| 4,790,706 | 12/1988 | Elhaus | 414/789.5 |
| 4,801,233 | 1/1989 | Ritola | 414/789.5 |
| 4,878,803 | 11/1989 | Whiddon | 414/789.5 |
| 5,246,333 | 9/1993 | Bowlin | 414/789.5 |
| 5,263,812 | 11/1993 | Bowlin | 414/789.5 |
| 5,350,272 | 9/1994 | Bowlin | 414/789.5 |

*Primary Examiner*—Karen Merritt
*Assistant Examiner*—Douglas Hess
*Attorney, Agent, or Firm*—Antony C. Edwards

[57] ABSTRACT

A device for placing transversely aligned spacing-sticks onto a top surface of a lumber stack. The device having a longitudinally translatable conveyor with stick supporting hooks depending therefrom, the conveyor and the supporting hooks adapted to convey longitudinally the spacing-sticks extending transversely across the conveyor and the stack of lumber, having a stick transferring device for transferring the spacing-sticks from the stick supporting hooks to the upper surface of the lumber stack. The stick transferring device having a first and a second vertically translatable frame, the second vertically translatable frame selectively longitudinally translatable relative to the first vertically translatable frame. The second vertically translatable frame further having a capture device for capturing opposed ends of a spacing-stick being translated longitudinally by the conveyor, the capture device having an apparatus for releasing the opposed ends of the spacing-stick so as to deposit the spacing-stick onto the upper surface of the lumber stack when the first and second translatable frames are in a lowered position.

9 Claims, 5 Drawing Sheets

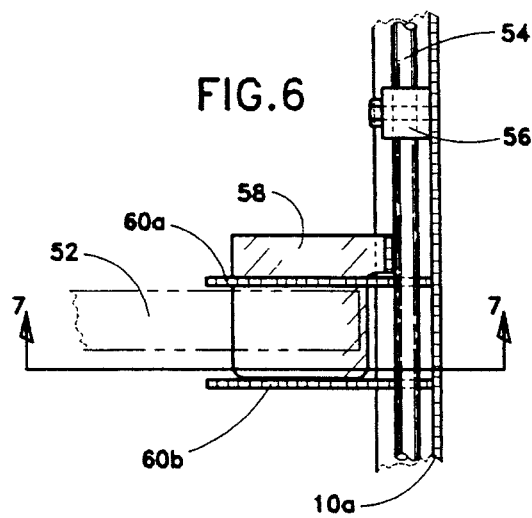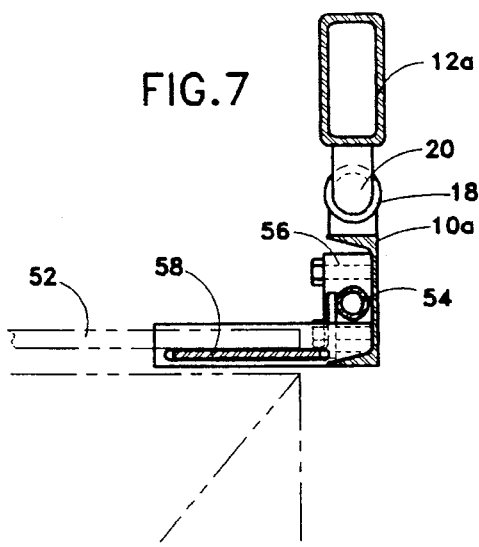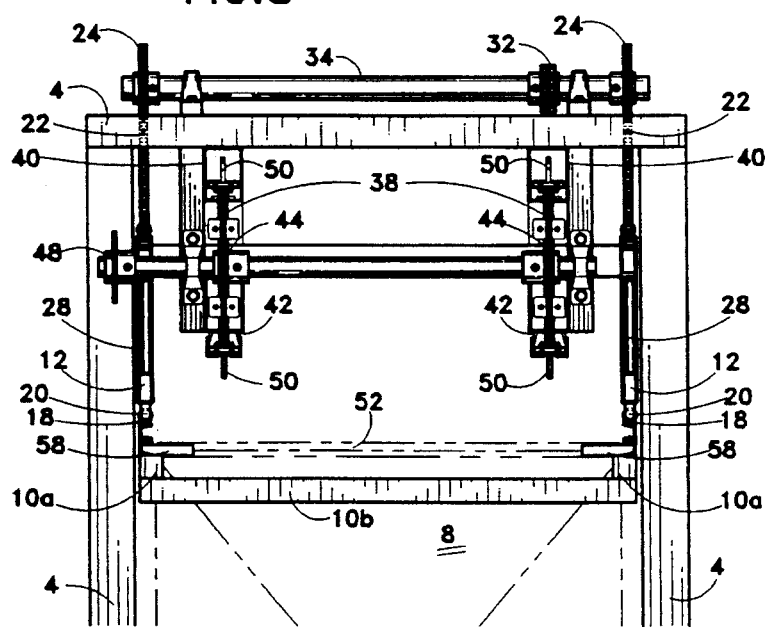

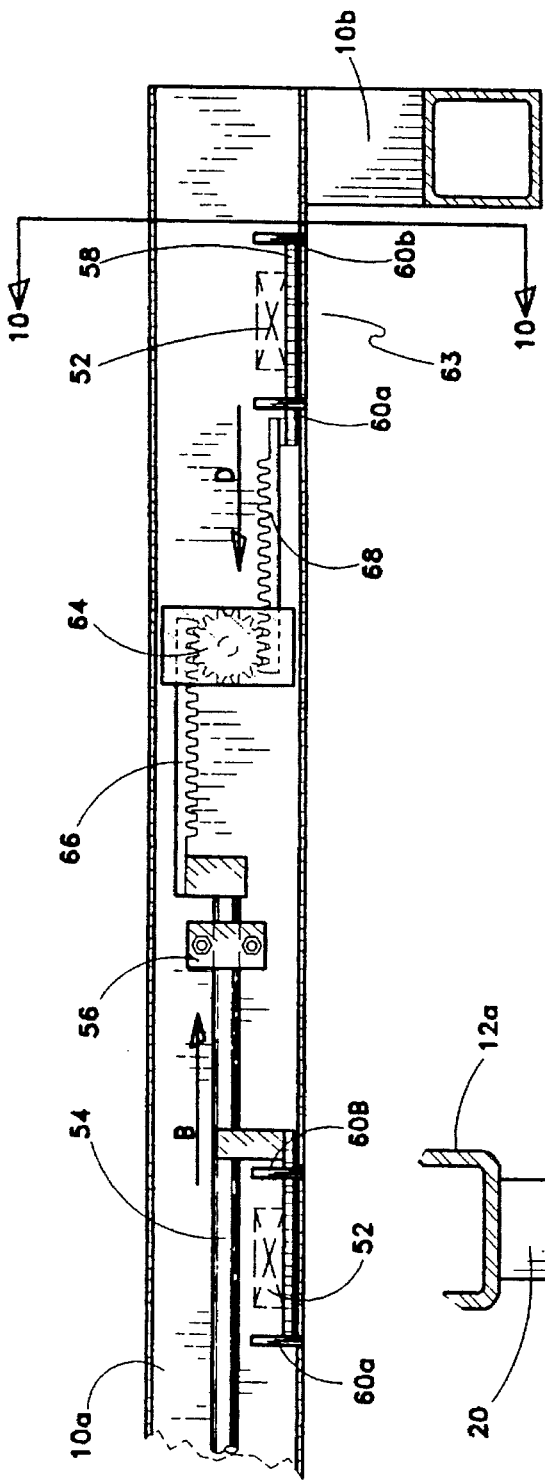
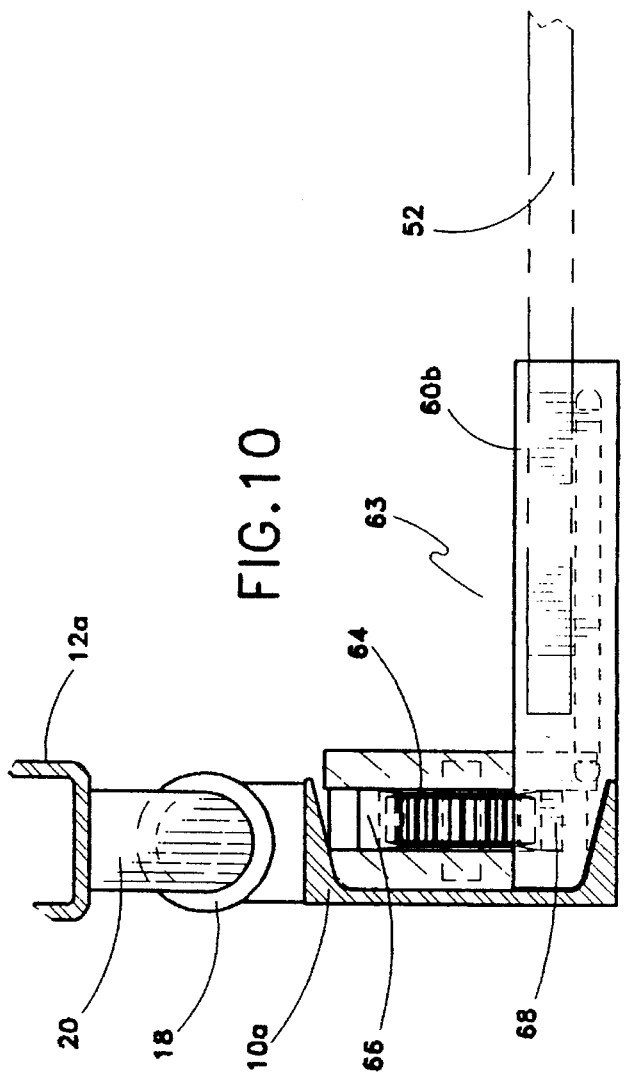
FIG.9
FIG.10

SIDE SHIFTING CARRIAGE FRAME STICK PLACER

FIELD OF THE INVENTION

The invention relates to the field of devices for transverse placement of spacing sticks between tiers of lumber in a tiered lumber package.

BACKGROUND OF THE INVENTION

Spacing sticks are placed between tiers of lumber in a lumber package for effective kiln or air drying. In the prior art, spacing stick placing devices would hang-up or misdeliver spacing sticks so that consistent and accurate delivery of spacing sticks to desired pre-determined positions upon each tier of lumber could not consistently be achieved. Consequently it is an object of the present invention to provide a device for consistent and accurate delivery of spacing sticks to desired pre-determined positions upon consecutive tiers of lumber in a lumber stack. It is a further object to provide such a device which may be retro-fitted to existing lumber stacking apparatus, which stick placing device will increase the speed of stick delivery over that currently provided in the prior art, the device capable of handling and placing a variety of spacing stick widths and thicknesses.

In the prior art, applicant is aware of U.S. Pat. No. 3,823,834 which issued to Rysti on Jul. 16, 1974 for "Method and Device for Performing the Insertion of Piling Strips in Timber Packages". Rysti discloses using an opposed pair of J-hook spacing stick conveyors for translating spacing sticks from a spacing stick allocator over a stack of lumber, each spacing stick carried in an opposed pair of J-hooks. A vertically movable frame having longitudinally displaceable spacing stick carrying hooks depending therefrom may be elevated so as to substantially horizontally align the longitudinally translatable hooks with the opposed pair of J-hooks carrying a spacing stick. The longitudinally translatable hooks may then be longitudinally translated so as to transfer the spacing stick from the opposed pair of J-hooks to the longitudinally translatable hooks. For this operation, the J-hook spacing stick conveyor is stationary. It is also taught that in order to accomplish this transfer of the spacing stick, the J-hook spacing stick conveyor may be moved in a reverse direction.

With the spacing stick transferred to the longitudinally translatable hooks, the vertically moveable frame may be lowered so as to bring the longitudinally translatable hooks carrying the spacing sticks into proximity with the top-most tier of lumber in the lumber stack. The longitudinally translatable hooks are then translated in a reverse direction to their first direction of longitudinal translation thereby depositing the spacing sticks onto the top-most tier of lumber by the action of stops depending from the vertically movable frame. The stops do not move when the longitudinally translatable hooks are translated and thus push the spacing sticks from the hooks.

The present invention improves on the Rysti vertically moveable frame stick-placing device by removing the requirement as taught by Rysti that the J-hook spacing stick conveyor be stationary when the spacing sticks are transferred to spacing stick carrying hooks on the vertically moveable frame. Consequently in the present invention speed of delivery of spacing sticks is increased in that the J-hook spacing-stick conveyor need not be brought to a halt and then re-started for every cycle of the stick placing device.

Applicant has found that if stick placing devices, of which the Rysti device is one, are used where it is desired to operate the spacing-stick conveyor at higher speeds, the spacing-stick being removed by the vertically moveable frame interferes with the next advancing J-hook on the conveyor. Typically the vertically moveable frame cannot be actuated quickly enough to remove the spacing-stick from the opposed pair of J-hooks carrying the spacing-stick and lower the spacing-stick out of the way of the next advancing opposed pair of J-hooks so that the next advancing opposed pair of J-hooks come into contact with the spacing-stick.

Consequently it is an object of the present invention to provide a vertically moveable frame stick-placing device having a second longitudinally slidable spacing-stick removing frame which can be longitudinally translated relative to the vertically moveable frame so that spacing-sticks can be removed from a moving spacing-stick conveyor and in particular from a relatively high-speed continuously moving spacing-stick conveyor. It is a further object to provide a spacing-stick placer that can place end spacing-sticks flush with the first edge and the last edge of a lumber stack in the direction of travel of spacing-sticks on the conveyor.

SUMMARY OF THE INVENTION

The apparatus includes an upper carriage frame and a lower carriage frame, collectively referred to as the carriage frames, cooperatively longitudinally translatable relative to each other. The carriage frames are simultaneously vertically translatable both up and down. The lower carriage frame has a longitudinally spaced plurality of opposed pairs of pockets. The pockets have pocket bottoms adapted to pick spacing sticks off opposed pairs of j-hooks carrying spacing-sticks on a moving spacing-stick conveyor moving longitudinally over the carriage frames. Ends of the spacing-sticks are captured within the pockets when the carriage frames are vertically translated to an upper end of a cyclical vertical stroke. The pocket bottoms are retractable when the carriage frames are at a lower end of their vertical stroke for precise placement of the spacing-sticks carried in the pockets on to the top of a tiered lumber package. The upper and the lower carriage frames are translated up or down their vertical stroke simultaneously by means of an elevation chain drive. Thus, the pocket bottoms lift the spacing-sticks off the spacing-stick conveyor j-hooks when at the top of the vertical stroke and then lower the spacing-sticks on to the lumber package where the pocket bottoms retract, thus depositing the spacing-sticks.

In one aspect then, a device is provided for placing transversely aligned spacing-sticks onto a top surface of a lumber stack. The device co-operates with a longitudinally translatable conveyor with stick supporting hooks depending therefrom, the conveyor and the supporting hooks adapted to convey longitudinally the spacing-sticks extending transversely across the conveyor and the stack of lumber. The device of the present invention provides stick transferring means for transferring the spacing-sticks from the stick supporting hooks to the upper surface of the lumber stack. The stick transferring means has a first and a second vertically translatable frame, the second vertically translatable frame selectively longitudinally translatable relative to the first vertically translatable frame. The second vertically translatable frame further has capture means for capturing opposed ends of a spacing-stick being translated longitudinally by the conveyor, the capture means having means for releasing the opposed ends of the spacing-stick so as to deposit the spacing-stick onto the upper surface of the lumber stack when the first and second translatable flames are in a lowered position.

BRIEF DESCRIPTION OF THE DRAWINGS

FIG. 6 is a plan view of FIG. 5.

FIG. 7 is a cross-sectional view along line 7—7 in FIG. 6.

FIG. 8 is a front elevation view, with upper and lower longitudinal frames lowered, of the device of FIG. 1.

FIG. 9 is an enlarged partial view of an embodiment incorporating reversed ending pockets on the front ends of the longitudinal channel members.

FIG. 10 is a cross-sectional view along line 10—10 in FIG. 9.

DETAILED DESCRIPTION OF THE PREFERRED EMBODIMENT

Figure 1:
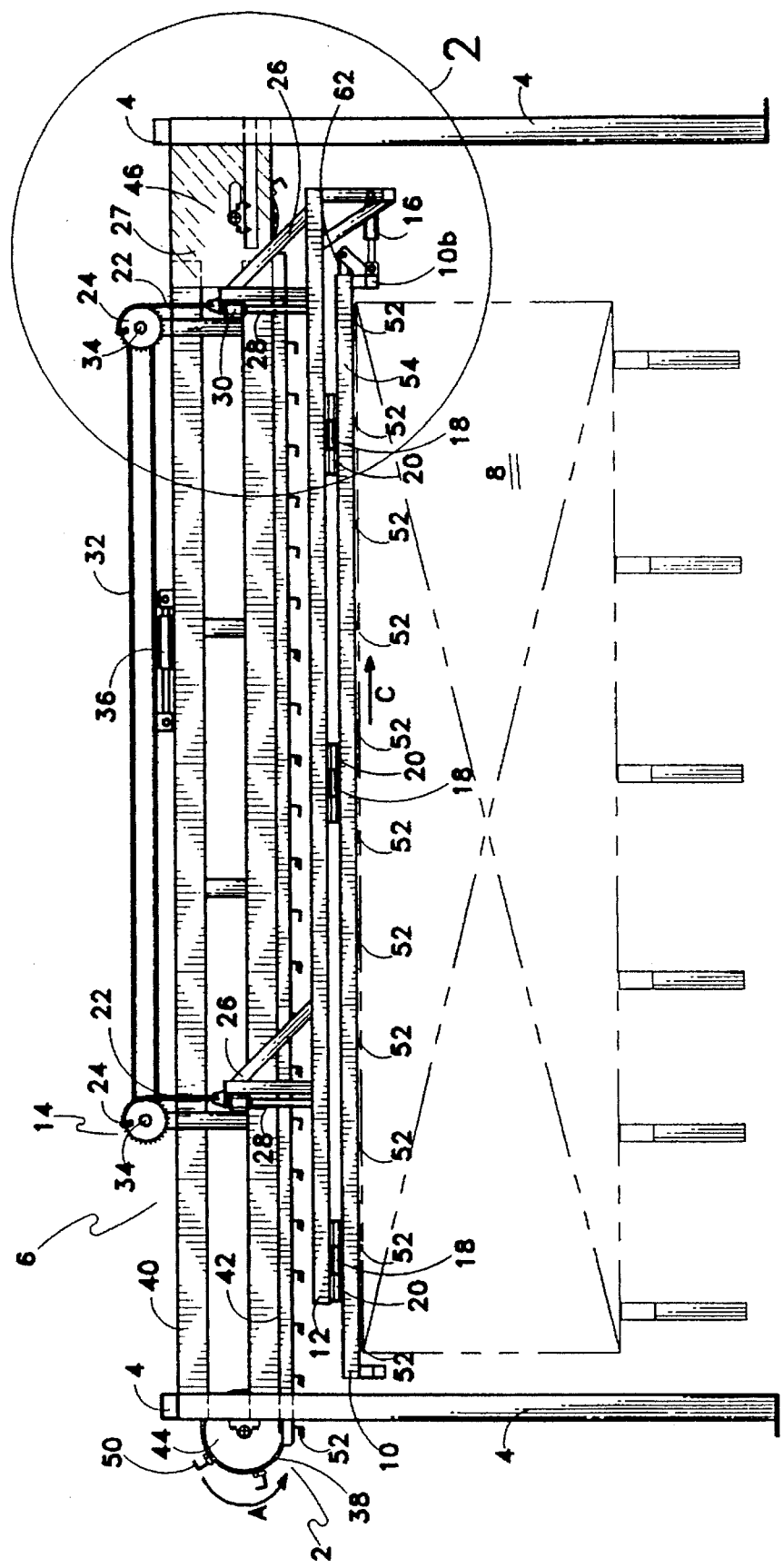
FIG. 1 is a right side elevation view of the sliding frame stick placer of the present invention.

As illustrated in FIG. 1, conventional J-hook stick conveyor 2 is mounted on support frame 4. Support frame 4 also supports the stick placer 6 of the present invention over lumber stack 8.

Stick placer 6 has lower longitudinal frame 10, upper longitudinal frame 12, and longitudinal frame elevating means 14.

Lower longitudinal frame 10 may be translated longitudinally relative to upper longitudinal frame 12 by the action of selectively actuable piston 16. Piston 16 is mounted at one of its ends to lower longitudinal frame 10 and at its other end to upper longitudinal frame 12. Lower longitudinal frame 10 is supported beneath upper longitudinal frame 12 by collars 18, mounted to lower longitudinal frame 10, sliding longitudinally along guides 20, mounted to upper longitudinal frame 12, journalled in collars 18.

Longitudinal frame elevating means 14 has elevating chains 22 mated at an upper end thereof around elevating sprockets 24 and at their lower end mounted to the top of vertical guide support frame 26. Vertical guide support frame 26 supports vertical guides 28 journalled in transverse members 30 mounted transversely across support frame 4 as better seen in FIG. 2. Drive chain 32 extends between elevating sprockets 24 rotatably mounted about sprocket axles 34. Drive chain 32 is rotated about sprocket axles 34 by the action of selectively actuable cylinder 36. Elevating chains 22 are either wrapped onto or unwrapped from elevating sprockets 24 when drive chain 32 is rotated about sprocket axles 34 to thereby elevate or lower, respectively, upper longitudinal frame 12 and lower longitudinal frame 10 relative to spacing-stick conveyor 2.

Spacing-stick conveyor 2 has an opposed parallel pair of conveyor chains 38 journalled in upper and lower channels 40 and 42, respectively. Conveyor chains 38 extend around front and rear opposed sprockets 44 and 46. Conveyor chains 38 rotate in direction A about sprockets 44 and 46. Conveyor chains 38 are driven by drive axle and sprocket 48 driving from sprocket 44 (see FIG. 3). A spaced array of J-hook spacing-stick carriers 50 in the shape of "J"-hooks, hereinafter J-hooks 50, are mounted along the length of conveyor chains 38 in opposed matched pairs. J-hooks 50 are oriented such that as conveyor chain 38 passes in direction A around front sprocket 44, J-hooks 50 are open in an upwards direction. A spacing-stick allocator (not shown) adjacent front sprocket 44 allocates spacing-sticks 52 into upwardly open J-hooks 50, one spacing-stick per opposed pair of J-hooks. It is understood that the spacing-stick allocator will allocate sticks to pairs of J-hooks in sequence with the required longitudinal spacing of the sticks along the surface of the lumber stack. That is, pairs of J-hooks may not be allocated sticks depending on the longitudinal spacing requirements.

Figure 2:
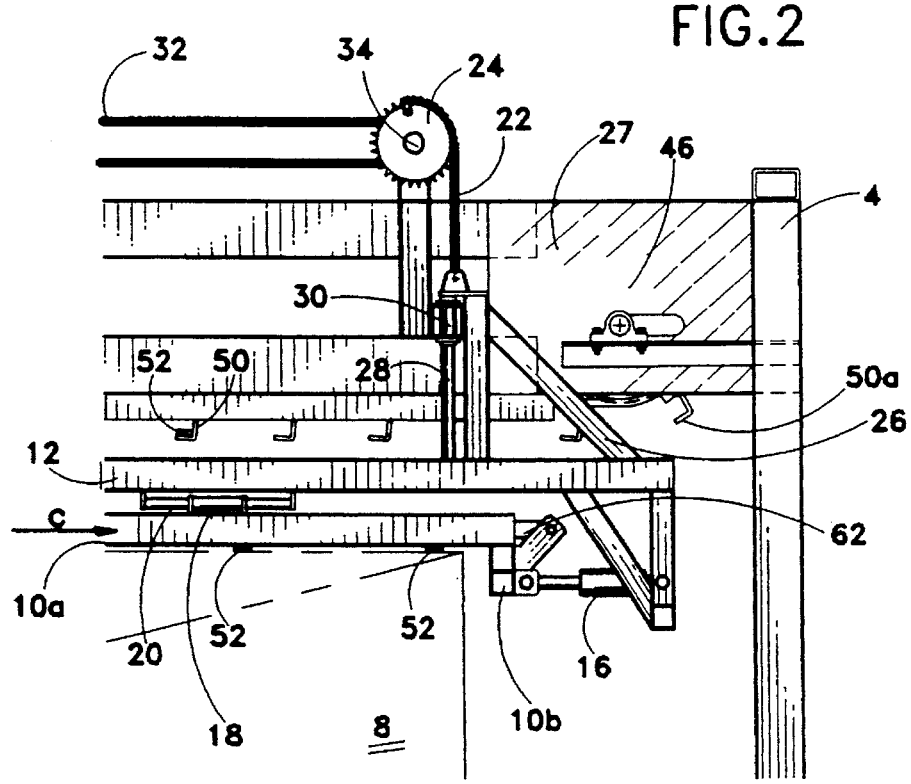
FIG. 2 is an enlarged partial right side elevation view of the rearmost end of the device of FIG. 1.

As best seen in FIG. 2, J-hooks 50 have spacing-stick support arms 50a on which rest spacing-sticks 52 as J-hooks 50 travel horizontally over the length of the upper surface of lumber stack 8.

Lower longitudinal frame 10 has longitudinal channel members 10a and transverse members 10b (better seen in FIG. 3) so as to form a rectangular frame when viewed from above, (not illustrated). As illustrated in FIG. 4, selectively actuable cylinder 16 is mounted between rearmost transverse member 10b and the corresponding transverse member 12b on upper longitudinal frame 12.

Figure 5:
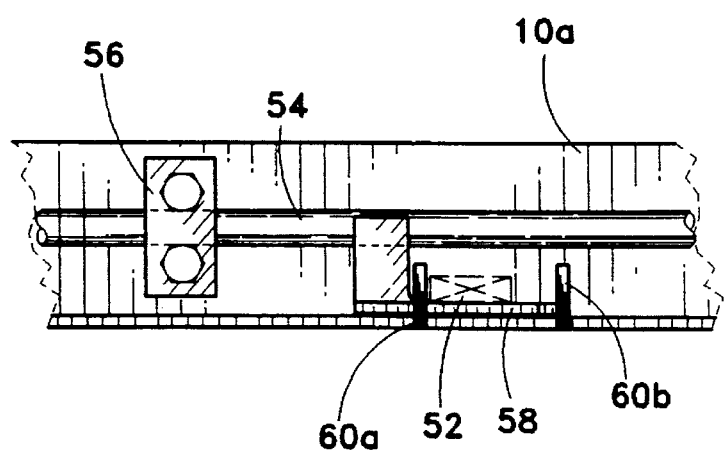
FIG. 5 is an enlarged cut-away view of the interior of a longitudinal member of the lower longitudinal frame.

Lower longitudinal frame 10 has an opposed pair of longitudinal push rods 54 within longitudinal channel members 10a as best seen in FIGS. 5–7. Within longitudinal channel members 10a, longitudinal push rods 54 are journalled within brackets 56. Depending from push rods 54 at selected intervals along push rods 54 are spacing-stick platforms 58. Gates 60a and 60b extend transversely inward from longitudinal channel members 10a. Gates 60a extend so as to transversely cross the upper surface of spacing-stick platforms 58. Gates 60b extend so as to transversely cross behind the rearmost edge of spacing-stick platforms 58 when spacing-stick platforms 58 are in their spacing-stick support position as illustrated in FIGS. 5–7. Spacing-sticks 52 supported on spacing-stick platforms 58 are thereby confined between gates 60a and 60b. Gates 60a and 60b and platforms 58 thereby form pockets for holding the ends of spacing-sticks 52, platforms 58 providing the pocket bottoms.

Selectively actuable cylinders 62, shown mounted at the rearmost end of longitudinal channel members 10a, and mounted between the rearmost ends of push rods 54 and the rearmost ends of longitudinal channel members 10a. When actuated, selectively actuable cylinders 62 drive push rods 54 and thereby sliding spacing-stick platforms 58 in direction B. In this manner spacing-stick platforms 58 are slid from beneath spacing-sticks 52 and spacing-sticks 52 allowed to fall under the force of gravity. It has been found advantageous to actuate first one then the other selectively actuable cylinder 62 in alternating sequence. Simultaneous actuation of selectively actuable cylinder 62 causes spacing-sticks 52 to roll about their longitudinal axis rather than dropping flat onto stack 8.

Figure 3:
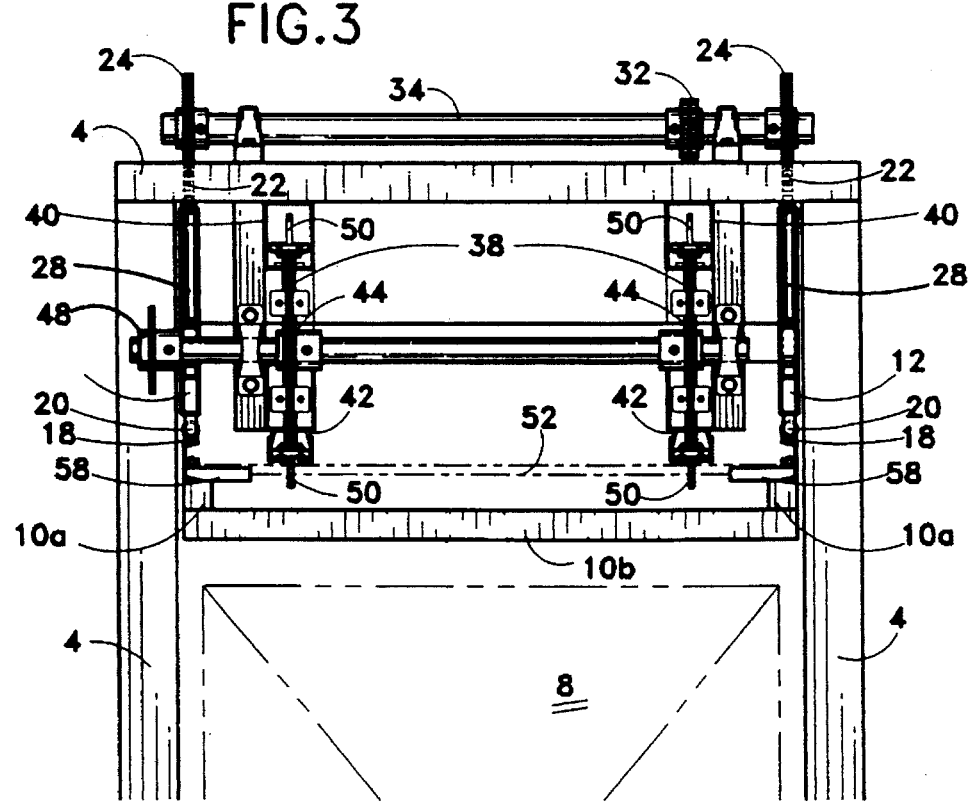
FIG. 3 is a front elevation view, with upper and lower longitudinal frames elevated, of the device of FIG. 1.
Figure 4:
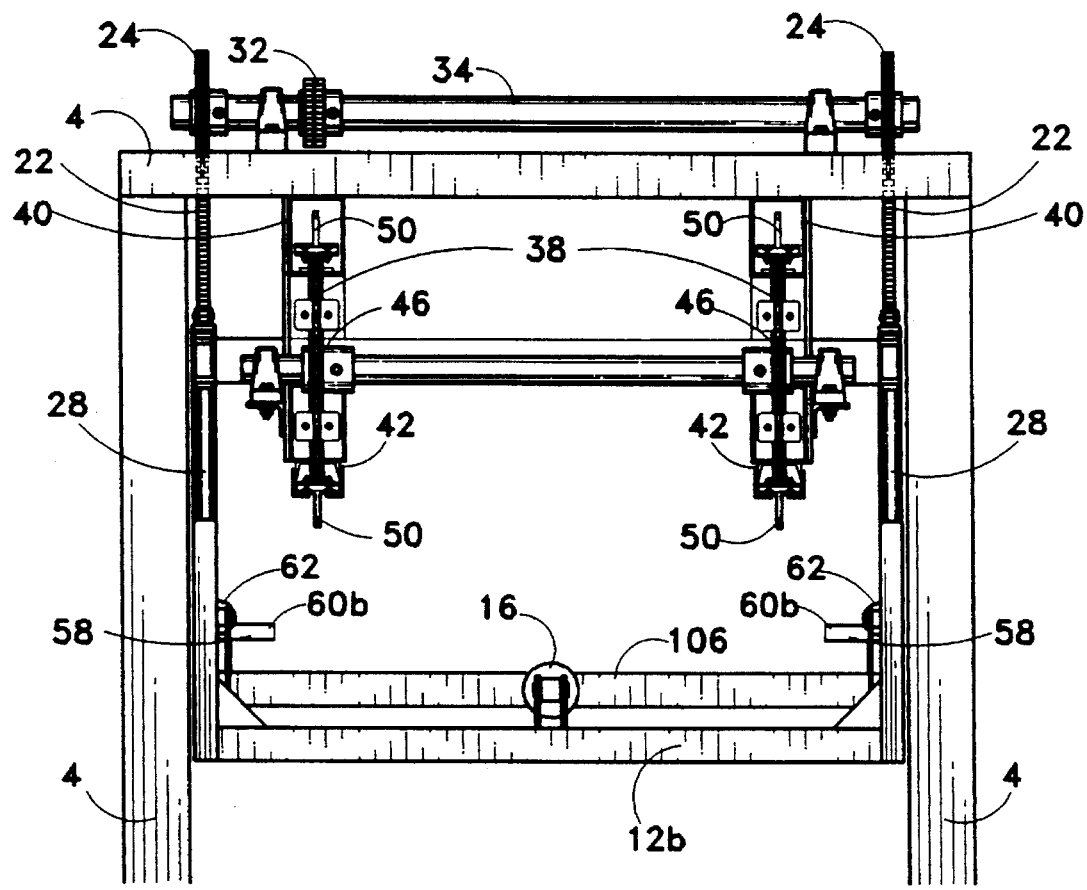
FIG. 4 is a rear elevation view, with upper and lower longitudinal frames lowered, of the device of FIG. 1.

FIG. 3 illustrates the carriage flames, namely upper longitudinal frame 12 and lower longitudinal frame 10, in their raised position. In operation, spacing-stick platforms 58 are thus raised to position the ends of spacing-sticks 52 between gates 60a and 60b so as to rest on spacing-stick platforms 58. Once thus positioned, spacing-sticks 52 may be removed from spacing-stick support arms 50a on J-hooks 50. The timing of elevating upper longitudinal frame 12 and lower longitudinal frame 10 by actuating selectively actuable cylinder 36 is such that spacing-sticks 52 held in J-hooks 50 are caught within gates 60a and 60b and placed on spacing-stick platforms 58 as spacing-sticks 52 are translated by spacing-stick conveyor 2 in direction A.

With the ends of spacing-sticks 52 captured between gates 60a and 60b and supported on spacing-stick platforms 58, spacing-sticks 52 are thereby removed from J-hooks 50 as the translation in direction A of spacing-stick 52 is arrested and the translation of J-hooks 50 in direction A carries spacing-stick support arms 50a from beneath spacing-stick 52. Once spacing-sticks 52, supported between gates 60a and 60b on spacing-stick platforms 58, are clear of J-hooks 50, upper longitudinal frame 12 and lower longitudinal frame 10 are lowered by actuating selectively actuable cylinder 36 in a reverse direction so as to lower spacing-sticks 50 into a position closely above the upper surface of lumber stack 8 as illustrated in FIG. 8.

Upper longitudinal frame 12 and lower longitudinal frame 10 support spacing-sticks 52 between opposed longitudinal channel members 10a on spacing-stick platforms 58. Once spacing-sticks 52 have been lowered into a position closely above lumber stack 8, spacing-stick platforms 58 are slid from under spacing-sticks 52 by alternating actuating of selectively actuable cylinders 62 to thereby deposit spacing-sticks 52 onto the upper surface of lumber stack 8. Spacing-sticks 52 thus deposited are illustrated in FIGS. 1 and 2.

With spacing-sticks 52 deposited onto the upper surface of lumber stack 8, upper longitudinal frame 12 and lower longitudinal frame 10 may then be re-elevated to capture the next advancing spacing-sticks 52 carried in J-hooks 50 for placement onto the next tier of lumber being placed onto lumber stack 8 by a lumber stacker (not shown).

As J-hooks 50 are continuously advancing in direction A, lower longitudinal frame 10 is selectively longitudinally translated relative to upper longitudinal frame 12 in direction C to momentarily reduce to close to zero the difference between the relative velocity of the J-hooks 50 carrying spacing-sticks 52 in direction A and the relative velocity of lower longitudinal frame 10 moving in direction C. In this manner opposed gates 60a and 60b and opposed spacing-stick platforms 58 are also translated in direction C momentarily at close to the same velocity as the ends of spacing-sticks 52 travelling in direction A. Capture of the ends of spacing-sticks 52 between opposed pairs of gates 60a and 60b is thereby facilitated.

Once the ends of spacing-sticks 52 are captured between opposed pairs of gates 60a and 60b and resting on spacing-stick platforms 58 the rate of translation of lower longitudinal frame 10 in direction C may be reduced to thereby gently remove spacing-stick 52 from J-hooks 50 still travelling in direction A. Once spacing-stick 52 is clear of J-hooks 50, lowering of upper longitudinal frame 12 and lower longitudinal frame 10 may begin, the translation in direction C of spacing-sticks 52 held on spacing-stick platforms 58 between opposed pairs of gates 60a and 60b continuing until spacing-sticks 52 have been lowered beneath the path of the next advancing pair of J-hooks 50.

As upper longitudinal frame 12 and lower longitudinal frame 10 are lowered towards the upper surface of lumber stack 8, lower longitudinal frame 10 is repositioned by actuation of selectively actuable cylinder 16 in a reverse direction to that used during the capture of spacing-sticks 52. Repositioning continues until the desired position of spacing-sticks 52 relative to the upper surface of lumber stack 8 is achieved.

Once spacing-sticks 52 have been deposited onto the upper surface of lumber stack 8, and while upper longitudinal frame 12 and lower longitudinal frame 10 are being re-elevated so as to continue the stick-placing cycle, selectively actuable cylinder 16 further translates lower longitudinal frame 10 relative to upper longitudinal frame 12 in a direction opposed to direction C. Lower longitudinal frame 10 is translated as far as the travel of collars on longitudinal guides 20 will allow in preparation for the translation of lower longitudinal frame 10 in direction C during the spacing-stick capture and removal phase of the stick-placing cycle.

As illustrated in FIGS. 9 and 10, ending pocket 63 may be incorporated into the ends of longitudinal channel 10a. Ending pockets 63 also comprise gates 60a and 60b and spacing stick platforms 58, however reversed 180 degrees to the spacing-stick pockets spaced along longitudinal channel members 10a between ending pockets 63 on the ends of channel members 10a. By means of toothed gear 64 cooperating with top and bottom pairs of opposed drive arms 66 and 68 respectively, the action of longitudinal push rods 54 translating in direction B drives bottom drive arms 68 in direction D, opposite to direction B.

Bottom drive arms 68 are connected to spacing-stick platforms 58 in ending pockets 63. Spacing-stick platforms 58 in ending pockets 63 are thus slid from beneath spacing-sticks 52 resting in ending pockets 63 so as to deposit spacing-sticks 52 onto the edges of the upper most tier of lumber stack 8. Spacing-sticks 52 may thereby be placed flush with the edge of lumber stack 8.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A device for transferring a transversely aligned spacing-stick from a longitudinally continuously translating conveyor having spacing-stick supporting hooks depending therefrom, onto a top surface of a lumber stack, said device comprising, stick transferring means for transferring said spacing-stick from said stick supporting hooks to said top surface of said lumber stack, said stick transferring means comprising first and second vertically translatable flames, said second vertically translatable frame co-operating with said first vertically translatable frame so as to be selectively longitudinally translatable relative to said first vertically translatable frame, said second vertically translatable frame further comprising spacing-stick capture and release means for capturing, when said first and second vertically translatable frames are in an elevated position, and subsequently releasing, when said first and second vertically translatable frames are in a lowered position, opposed ends of said spacing-stick being translated longitudinally by said conveyor, said spacing-stick capture and release means having means for selectively releasing opposed ends of said spacing-stick captured by said spacing-stick capture and release means so as to deposit said spacing-stick onto said top surface of said lumber stack when said first and second vertically translatable frames are in said lowered position, selectively actuable vertical translation means for selectively elevating and lowering said first and second vertically translatable frames between said elevated position and said lowered position, and selectively actuable longitudinal translation means for selectively longitudinally translating said second vertically translatable frame relative to said first vertically translatable frame.

2. The device of claim 1 wherein said spacing-stick capture and release means comprises a laterally opposed pair of spacing-stick pockets having spacing-stick retaining arms and selectively removable spacing-stick support means, whereby said selectively removable spacing-stick support means may be selectively removed from a supporting position beneath the ends of a spacing-stick supported in said spacing-stick pockets.

3. The device of claim 2 wherein said second vertically translatable frame is selectively longitudinally translated relative to said first translatable frame by the selective actuation of a longitudinal rod mounted to said first translatable frame, said longitudinal rod slidingly journalled in a collar mounted to said second longitudinal frame.

4. The device of claim 3 wherein said longitudinal translation means for selectively longitudinally translating said second vertically translatable frame relative to said first vertically translatable frame comprises a first selectively actuable cylinder, said first selectively actuable cylinder mounted at a first end to said second vertically translatable frame and mounted at a second opposed end to said first translatable frame.

5. The device of claim 4 wherein said vertical translation means for selectively elevating and lowering said first and second vertically translatable frames between said elevated position and said lowered position comprises an elevating sprocket, said elevating sprocket having an elevating chain attached at one end to said first vertically translatable frame and at its other end to the said elevating sprocket, whereby when said elevating sprocket is selectively actuated, said elevating chain may be selectively wound onto or unwound from said elevating sprocket thereby raising or lowering respectively said first and second vertically translatable frames between said elevated position and said lowered position.

6. The device of claim 5 wherein said vertical translation means further comprises a second selectively actuable cylinder cooperating with said elevating sprocket, so as to selectively actuate said elevating sprocket.

7. The device of claim 2 wherein said selectively removable spacing-stick support means comprises spacing stick platforms mounted inwardly of selectively actuable push rods sliding longitudinally mounted along opposed longitudinal sides of said second vertically translatable frame, and selectively actuable means for selectively sliding said push rods longitudinally relative to said second vertically translatable frame.

8. A method for transferring a transversely aligned spacing-stick from a longitudinally continuously translating conveyor conveying said spacing stick at a rate of translation said conveyor having spacing-stick supporting hooks depending therefrom, onto a top surface of a lumber stack by means of a spacing-stick transferring device for transferring said spacing-stick from said spacing-stick supporting hooks to said top surface of said lumber slack, said spacing-stick transferring device having first and second vertically translatable frames simultaneously vertically translatable, said second vertically translatable frame cooperating with said first vertically translatable frame so as to be selectively longitudinally translatable relative to said first vertically translatable frame, said second vertically translatable frame having spacing-stick capture and release means for capturing, when said first and second vertically translatable frames are in an elevated position, and subsequently releasing, when said first and second vertically translatable frames are in a lowered position, opposed ends of said spacing-stick being translated longitudinally by said conveyor, said spacing-stick capture and release means having means for selectively releasing opposed ends of said spacing-stick captured by said spacing-stick capture and release means so as to deposit said spacing-stick onto said top surface of said lumber stack when said first and second vertically translatable frames are in said lowered position, vertical translation means for selectively elevating and lowering said first and second vertically translatable frames between said elevated position and said lowered position, and longitudinal translation means for selectively longitudinally translating said second vertically translatable frame relative to said first translatable frame, comprising the steps of:
(a) selectively actuating said vertical translation means so as to elevate said first and second vertically translatable frames to said elevated position,
(b) simultaneously actuating said selectively actuable longitudinal translation means to longitudinally translate said second vertically translatable frame and said spacing-stick capture and release means in a first direction relative to said first vertically translatable frame wherein said first direction corresponds to the direction of longitudinal continuous translation of said spacing-stick being translated by said conveyor,
(c) timing said elevation of said first and second vertically translatable frames to said elevated position and said translation of said second vertically translatable frame and said spacing-stick capture and release means in said first direction so as to capture in said spacing-stick capture and release means, ends of said spacing-stick being translated by said conveyor,
(d) selectively actuating said vertical translation means so as to lower said first and second vertically translatable frames to said lowered position,
(e) selectively actuating said longitudinal translation means in a second direction opposed to said first direction once said first and second vertically translatable frames are lowered beneath said conveyor so as to selectively position said spacing-stick captured in said spacing-stick capture and release means relative to said top surface of said lumber stack,
(f) releasing said spacing-stick from said spacing-stick capture and release means so as to deposit said spacing-stick onto said top surface of said lumber stack.

9. The method of claim 8 wherein the step of simultaneously actuating said selectively actuable longitudinal translation means to longitudinally translate said second vertically translatable frame and said spacing-stick capture and release means in said first direction further comprises the step of translating said second vertically translatable frame and said spacing-stick capture and release means in said first direction at least momentarily at a speed substantially equivalent to said rate of translation of said spacing-stick carried by said conveyor, and timed to coincide with said step of timing said elevation of said first and second vertically translatable frames to said elevated position and said translation of said second vertically translatable frame and said spacing-stick capture and release means in said first direction so as to capture in said spacing-stick capture and release means, ends of said spacing-stick being translated by said conveyor.

* * * * *